United States Patent [19]

Jahnke

[11] 4,002,888
[45] Jan. 11, 1977

[54] TEST FORM FOR USE WITH A TEST SCORING APPARATUS

[75] Inventor: Richard E. Jahnke, St. Paul, Minn.

[73] Assignee: Minnesota Mining and Manufacturing Company, St. Paul, Minn.

[22] Filed: Apr. 17, 1975

[21] Appl. No.: 569,311

[52] U.S. Cl. .................. 235/61.12 N; 35/48 B; 235/61.6 E
[51] Int. Cl.² ................ G06K 19/00; G09B 7/06
[58] Field of Search ............ 235/61.12 N, 61.6 E; 250/557; 35/48 B

[56] References Cited
UNITED STATES PATENTS

| | | | |
|---|---|---|---|
| 3,201,569 | 8/1965 | Conron | 235/61.6 E |
| 3,267,258 | 8/1966 | Bene | 35/48 B |
| 3,408,482 | 10/1968 | Busby | 235/61.6 E |
| 3,518,440 | 6/1970 | Hanson et al. | 250/557 |
| 3,643,348 | 2/1972 | Azure, Jr. | 235/61.6 E |

Primary Examiner—Daryl W. Cook
Attorney, Agent, or Firm—Alexander, Sell, Steldt & DeLaHunt

[57] ABSTRACT

A test form for use with a test scoring apparatus of the type for sensing the presence of indicia in answer indication areas on the test form. The test form includes a longitudinal column of timing marks positioned in relation to the answer indication areas to time the sensing of each answer indication area. The test form is characterized by the answer indication areas having enlarged dimensions so as to facilitate the use of the form by very young students and persons with less proficient motor skills. For those embodiments of the form wherein the timing mark column contains a given number of timing marks and the spacing of the marks in relation to the dimensions of the enlarged answer indication areas is such that more than one timing mark is positioned to time the sensing of more than one region within an answer indication area, a number of timing marks corresponding to the number of rows of answer indication areas on the form are positioned to time the sensing of the center of each answer indication area and the test scoring apparatus is programmed to provide a "right" answer indication in response to only indicia sensed in the longitudinal center regions of selected answer indication areas.

8 Claims, 10 Drawing Figures

TEST FORM FOR USE WITH A TEST SCORING APPARATUS

BACKGROUND OF THE INVENTION

1. Field of the Invention

The present invention generally pertains to test forms for use with test scoring apparatus of the type for sensing the presence of indicia in answer indication areas on the test form; and specifically provides an improvement to such test forms of this type as have timing mark columns positioned in relation to the answer indication areas to time the sensing of each answer indication area.

2. Description of the Prior Art

Typical of this class of test forms is the form described in U.S. Pat. No. 3,518,440 to Hanson et al. The form described therein is useful with a test scoring apparatus containing photoelectric sensing apparatus of the type described in the Hanson et al. patent.

This test form has the following features: (a) a generally rectangular shaped sheet of paper or like material having longitudinal and transverse axes, and at least one generally straight edge parallel with one of said axes, the straight edge providing a reference edge for guiding the movement of the paper through the sensing apparatus; (b) a series of question locations indicated on the sheet of paper with each question location having a number of answer indication areas indicated on the sheet in which indicia can be entered, said number of answer indication areas of each question location being spaced to form transverse rows generally perpendicular to the straight edge of the sheet and/or being spaced to form longitudinal columns generally parallel with the straight edge of the sheet, and the series of question locations being spaced with answer indication areas therein being aligned with similar answer indication areas of other question locations to form longitudinal columns generally parallel with the straight edge of the sheet; and (c) a timing mark column generally parallel to the straight edge of the sheet containing a plurality of timing marks, with one of the timing marks being positioned in relation to each row of answer indication areas to time the sensing of each answer indication area.

This test form is limited in the scope of its application, however, in that the longitudinal dimensions of the answer indication areas are approximately one millimeter; which dimension is so small that very young students persons of less proficient motor skills have experienced difficulty in accurately entering indicia in the answer indication areas to assure reliable sensing thereof by the sensing apparatus. Also, answer indication areas of such small size do not enable the preparation of a species of testing format that is preferred by educators for presentation to very young students, wherein the various answer choices (rather than a mere symbol indicative of the answer choice) are contained within the plurality of answer indication areas at each question location. Such a format is illustrated in FIG. 1 of the Drawing.

Notwithstanding the aforementioned limitations, test forms having such an enlarged answer indication format heretofore have not been adopted for use with test scoring apparatus, or vice versa. Perhaps, this is because of the fact that in order for a test form to be useful with a particular test scoring apparatus (the Model 550 Electronic Test Scorer sold by Minnesota Datronics Inc., Saint Paul, Minnesota, U.S.A.) that has been widely distributed and presently is being used in many school systems, the test form must contain at least a given number of timing marks in the timing mark column, and the timing marks must be separated from one another by at least approximately 5 millimeters. For a test form having enlarged answer indication areas, not as many such areas can be included along the longitudinal dimension of a standard size sheet (which is approximately 35 centimeters). Thus the test form would contain more timing marks than are needed; and because the timing marks must be separated by at least 5 millimeters they must be spread out over the longitudinal dimension of the sheet, whereby the unneeded timing marks cannot be merely crowded into one small region that is not aligned with any of the answer indication areas. In view of these considerations the test form would have to contain extra space containing only the timing marks and/or some answer indication areas would have to have more than one timing mark aligned therewith, whereby the test scoring apparatus could be enabled to respond more than once to a single indicia in a single answer indication area.

SUMMARY OF THE INVENTION

The improved test forms of the present invention are characterized by having enlarged answer indication areas. It has been found that answer indication areas having a longitudinal dimension of at least 5 millimeters provide sufficient space for enabling use of the test form by very young students and persons with less proficient motor skills; although respective longitudinal dimensions of approximately 10 millimeters, 15 millimeters and 30 millimeters are preferred for various formats that are described hereinbelow.

Improved test forms wherein the timing mark column contains a given number of timing marks which is greater than the number of rows of answer indication areas, are characterized by the spacing of the timing marks in relation to the longitudinal dimensions of the answer indication areas being such that for at least one said answer indication area, more than one timing mark is positioned to time the sensing of more than one region within said answer indication area; wherein a number of said timing marks corresponding to the number of rows of answer indication areas are positioned in relation to each said row to time the sensing of the longitudinal center of each answer indication area.

In order to use the improved test form of the present invention wherein the answer indication areas of the test form have a first longitudinal dimension, with a test scoring apparatus containing a sensing apparatus of the type described in the aforementioned Hanson et al. patent, which apparatus is capable of sensing indicia within a shorter second longitudinal dimension, the test scoring apparatus is programmed to provide a "right" answer indication in response to only indicia sensed in the longitudinal center regions of selected answer indication areas.

In view of these features the improved test form of the present invention may further include answer indication areas which abut one another in a column of answer indication areas within a given question location, thereby improving the utilization of the available space on the test form.

DESCRIPTION OF THE PREFERRED EMBODIMENTS

Figure 1:
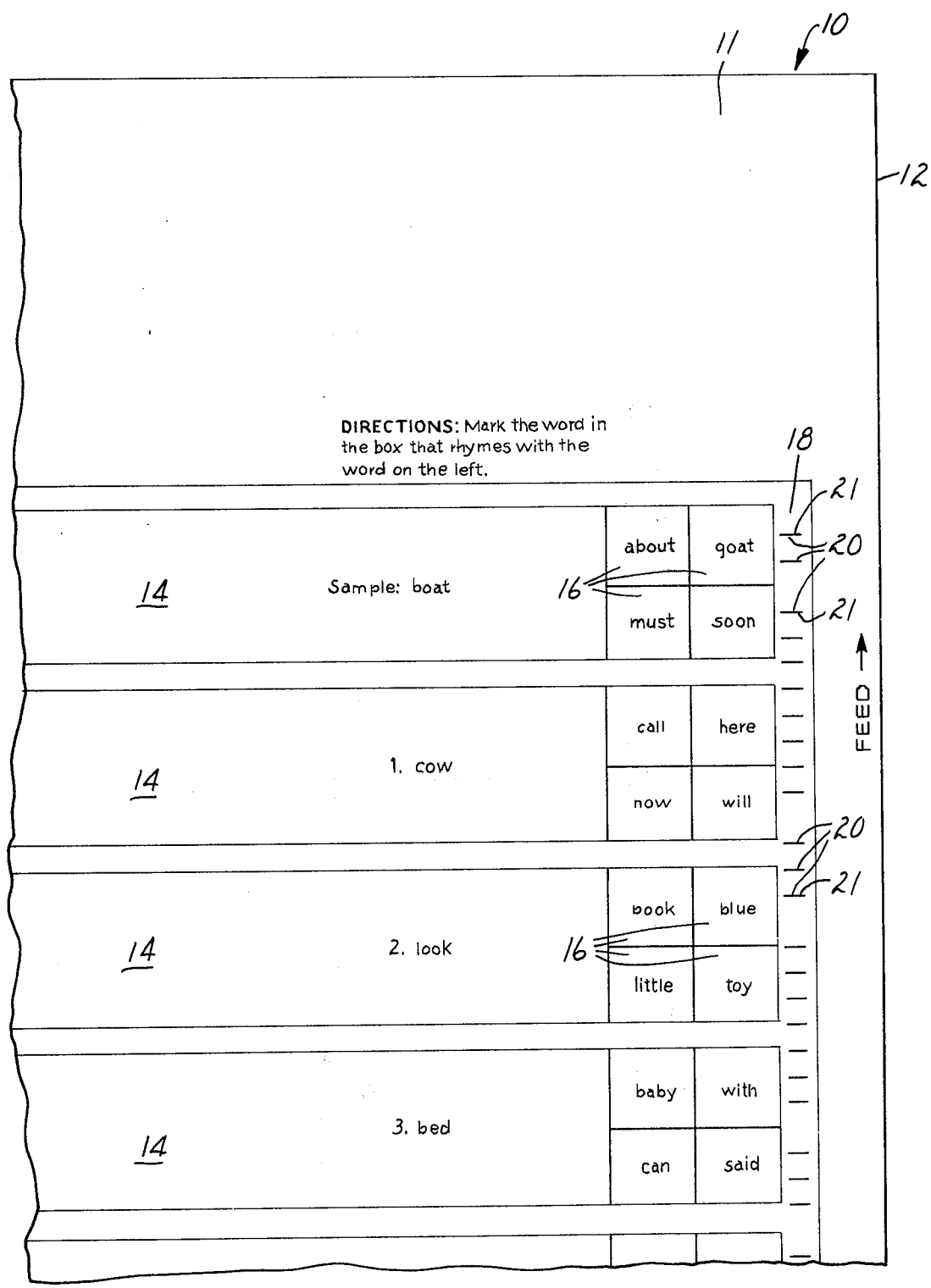
FIG. 1 is a plan view of a portion of a preferred embodiment of an improved test form according to the present invention.

Referring to FIG. 1, the test form 10 includes a generally rectangular shaped sheet of paper 11 having longitudinal and transverse axes, and at least one generally straight edge 12 parallel with one of said axes. The straight edge 12 provides a reference edge for guiding the movement of the paper through a sensing apparatus.

A series of question locations 14 are indicated on the sheet of paper 11 with each question location 14 having a number of answer indication areas 16. The answer indication areas 16 of each question location 14 are spaced to form transverse rows generally perpendicular to the straight edge 12 of the sheet 11 and are also spaced to form longitudinal columns generally parallel with the straight edge 12 of the sheet 11. The question locations 14 are spaced with answer indication areas 16 in each location 14 being aligned with similar answer indication areas 16 of other question locations 14 to form longitudinal columns generally parallel with the straight edge 12 of the sheet 11.

A timing mark column 18 is positioned parallel to the straight edge 12 of the sheet 11. The timing mark column 18 contains a given number of timing marks 20 which is greater than the number of rows of answer indication areas 16.

The spacing of the timing marks 20 in relation to the longitudinal dimensions of the answer indication areas 16 is such that for certain ones of the answer indication areas 16, more than one timing mark 20 is positioned to time the sensing of more than one region within such answer indication areas 16. Therefore, a number of timing marks 21 corresponding to the number of rows of answer indication areas 16 are positioned in relation to each such row to time the sensing of the longitudinal center of each answer indication area 16.

The printing on the answer form 10, for indicating the question locations 14, the answer indication areas 16, the directions, the questions, and the answer choices is in a color to which the sensing apparatus of the test scoring apparatus is insensitive.

The preferred longitudinal dimension of the answer indication areas 16 for test forms having a question location format as shown in FIG. 1 is approximately 15 millimeters.

To program a test scoring apparatus to provide "right" answer indications when indicia are sensed in selected answer indication areas, a test form containing indicia in those answer indication areas containing the selected "right" answers, (hereinafter referred to as an "answer key") is moved through the test scoring apparatus while the latter is in a "program" mode of operation. The test scoring apparatus is then placed in a "score" mode of operation and test forms that have been completed by the students are moved through the test scoring apparatus, wherein the answer indication areas thereof are sensed by the sensing apparatus; and a "right" answer indication is provided by the test scoring apparatus whenever an indicium is sensed at a position in the student's test form corresponding to a position on the answer key where an indicium has been entered to indicate a selected "right" answer.

Figure 2:
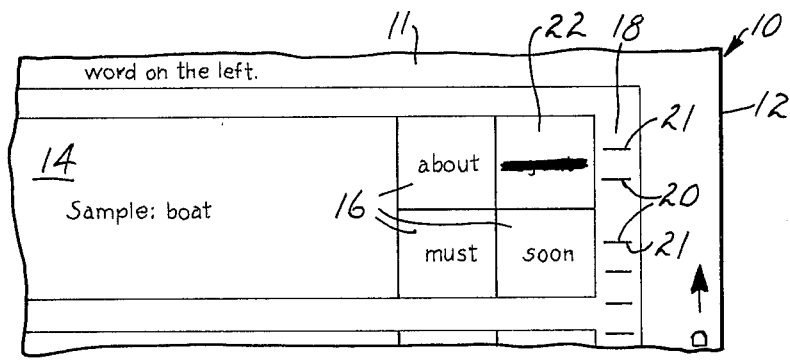
FIG. 2 shows a portion of the test form of FIG. 1 that has been marked in accordance with the present invention for use as an answer key in programming a test scoring apparatus.

In accordance with the present invention the answer key is completed by entering an indicium in only the longitudinal center of the selected answer indication area 22 containing the right answer, as shown in FIG. 2. As a result, the test scoring apparatus will provide a "right" answer indication in response to only indicia in the longitudinal center regions of the selected answer indication areas containing the right answer. Therefore, even though an answer indication area of the test form in which the student has correctly entered an indicium indicative of his answer choice may have more than one timing mark aligned therewith, and such indicia extends to a nonlongitudinally centered (i.e. peripheral) region of the answer indication area which is sensed by the sensing apparatus in response to the sensing of a timing mark positioned for the timing thereof, whereby the sensing apparatus will respond thereto by sensing more than one indicium in such answer indication area, only a single "right" answer indication will be provided by the test scoring apparatus, because the test scoring apparatus has been programmed, in effect, to ignore indicia in the longitudinal peripheral regions of the selected answer indication areas when determining whether it should provide such a "right" answer indication.

Because only the longitudinal center region of an answer indication area is so considered by the test scoring apparatus in making such a determination, adjacent answer indication areas 16 in a column of answer indication areas within a given question location 14 may abut one another, inasmuch as an indicium placed by a student in a first answer indication area, but extending only slightly into a peripheral region of an adjacent second answer indication area would not be considered by the test scoring apparatus as an indicium in such second answer indication area.

Additional preferred embodiments of question formats for test forms in accordance with the present invention are illustrated in FIGS. 3 through 10.

Figure 3:
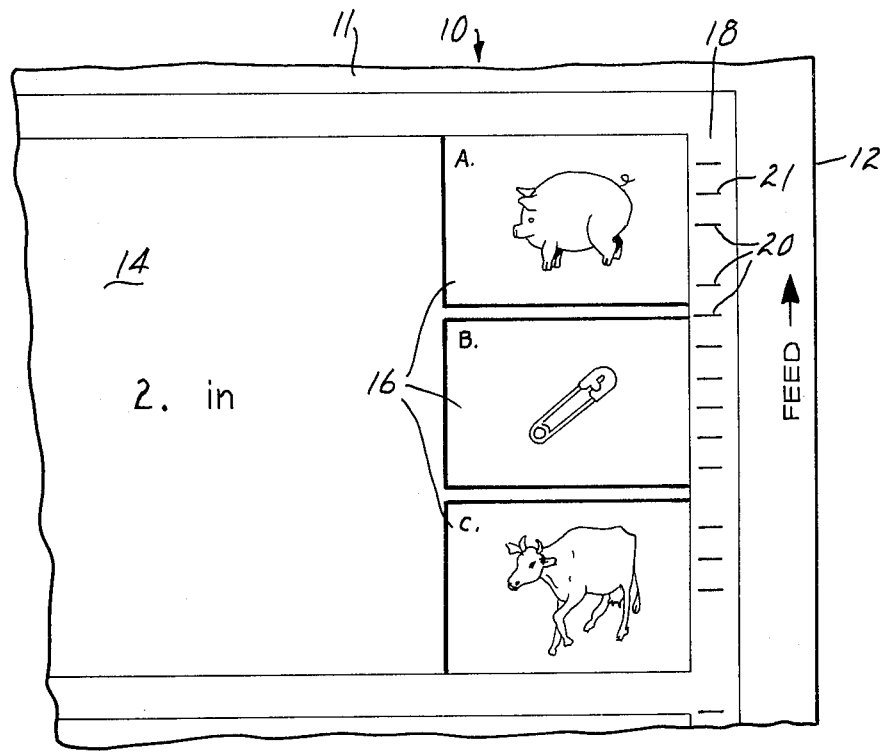
FIGS. 3 through 10 illustrate various question location formats and adjacent aligned timing marks for different preferred embodiments of the present invention.
Figure 4:
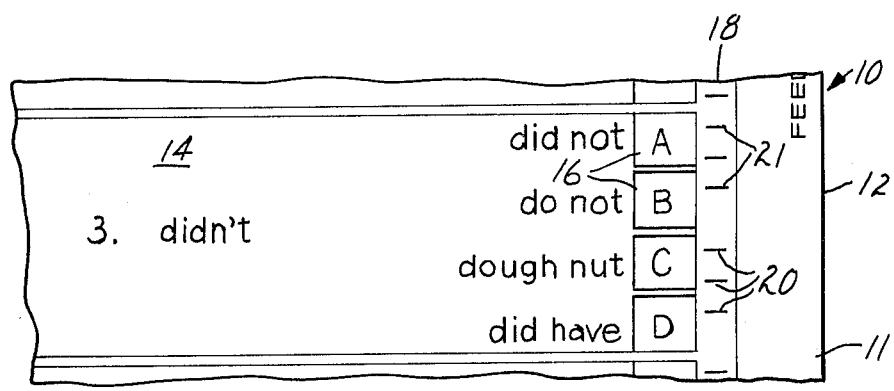
Figure 5:
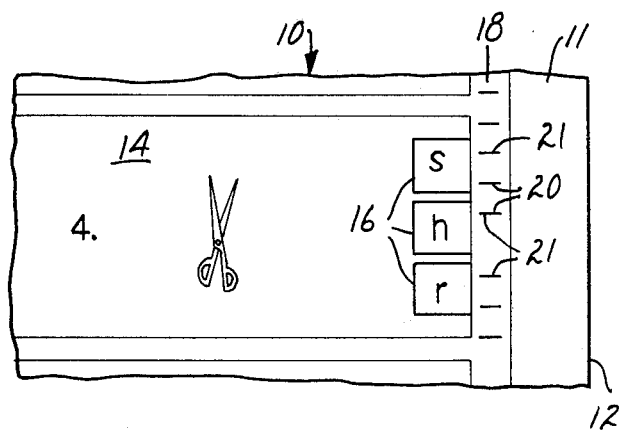
Figure 6:
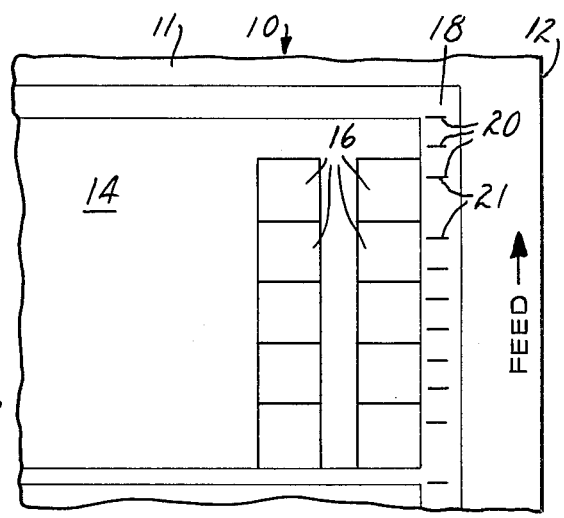
Figure 7:
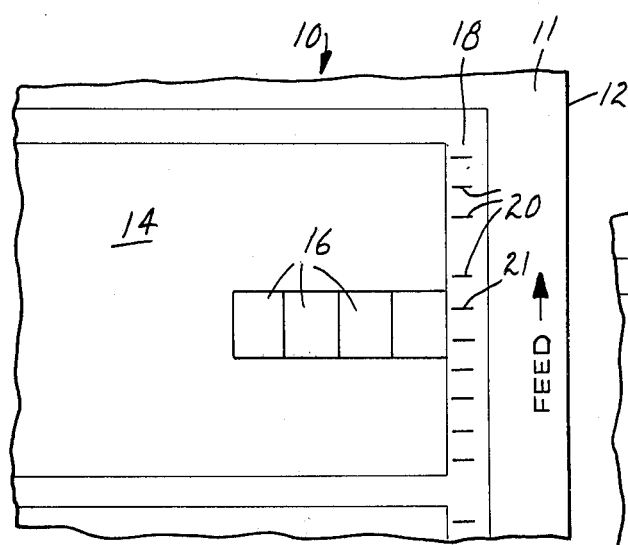
Figure 8:
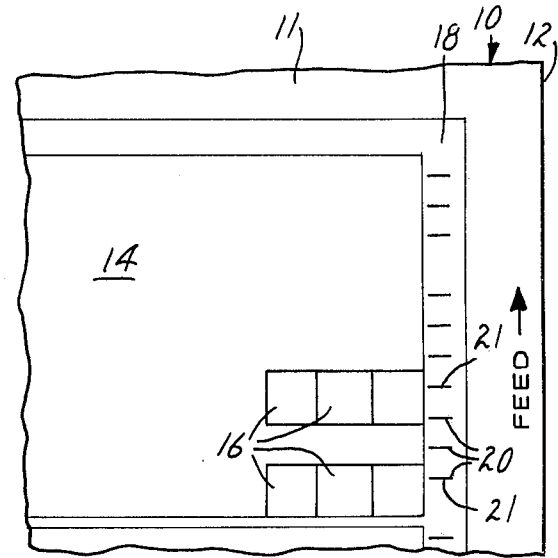
Figure 9:
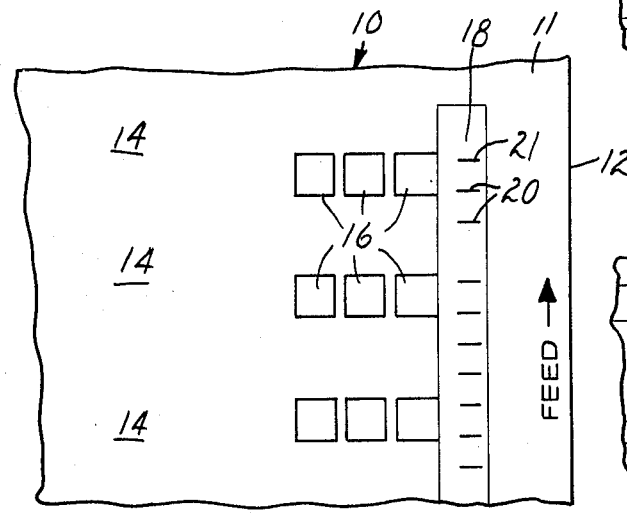
Figure 10:
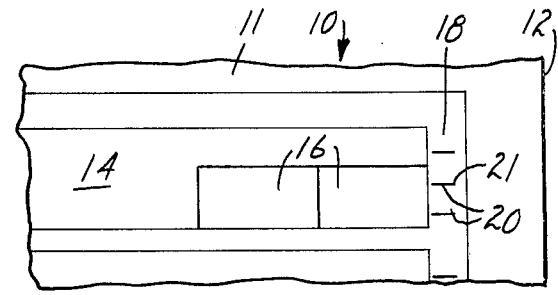

The preferred longitudinal dimension of the answer indication areas 16 in the question location format shown in FIG. 3 is about 30 millimeters.

The preferred longitudinal dimension of the answer indication areas 16 in the various question location formats shown in FIG. 4 through 10 is about 10 millimeters.

What is claimed is:

1. A test form for use with a test scoring apparatus of the type for sensing the presence of indicia in answer indication areas on the test sheet, said test form comprising:
   a. a generally rectangular shaped sheet of paper or like material having longitudinal and transverse axes, and at least one generally straight edge parallel with one of said axes, said straight edge providing a reference edge for guiding the movement of the paper through said sensing apparatus;
   b. a series of question locations indicated on said sheet of paper with each question location having a number of answer indication areas indicated on said sheet in which indicia can be entered, said number of answer indication areas of each question location being spaced to form transverse rows generally perpendicular to said straight edge of the sheet and/or being spaced to form longitudinal columns generally parallel with the straight edge of the sheet, and said series of question locations being spaced with answer indication areas therein being aligned with similar answer indication areas of other question locations to form longitudinal columns generally parallel with said straight edge of the sheet; and c. a timing mark column generally parallel to said straight edge of the sheet containing a given number of timing marks which is greater than the number of rows of answer indication areas, with one of the timing marks being positioned in relation to each row of answer indication areas to time the sensing of each answer indication area;

wherein the improvement comprises the spacing of the timing marks in relation to the longitudinal dimensions of the answer indication areas being such that for at least one said answer indication area, more than one timing mark is positioned to time the sensing of more than one region within said answer indication area; wherein a number of said timing marks corresponding to the number of rows of answer indication areas are positioned in relation to each said row to time the sensing of the longitudinal center of each answer indication area.

2. A test form according to claim 1, wherein said answer indication areas have a longitudinal dimension of approximately 10 millimeters.

3. A test form according to claim 1, wherein said answer indication areas have a longitudinal dimension of approximately 15 millimeters.

4. A test form according to claim 1, wherein said answer indication areas have a longitudinal dimension of approximately 30 millimeters.

5. A test form according to claim 1, wherein adjacent answer indication areas in a column of answer indication areas within a given question location abut one another.

6. A test form according to claim 1, wherein said answer indication areas have a longitudinal dimension of approximately 10 millimeters.

7. A test form according to claim 1, wherein said answer indication areas have a longitudinal dimension of approximately 15 millimeters.

8. A test form according to claim 1, wherein said answer indication areas have a longitudinal dimension of approximately 30 millimeters.

* * * * *